United States Patent
Hoskote

(10) Patent No.: US 7,024,439 B2
(45) Date of Patent: Apr. 4, 2006

(54) LEADING ZERO ANTICIPATORY (LZA) ALGORITHM AND LOGIC FOR HIGH SPEED ARITHMETIC UNITS

(75) Inventor: Yatin Hoskote, Portland, OR (US)

(73) Assignee: Intel Corporation, Santa Clara, CA (US)

(*) Notice: Subject to any disclaimer, the term of this patent is extended or adjusted under 35 U.S.C. 154(b) by 572 days.

(21) Appl. No.: 10/057,257

(22) Filed: Jan. 24, 2002

(65) Prior Publication Data

US 2003/0140074 A1    Jul. 24, 2003

(51) Int. Cl.
G06F 7/00 (2006.01)
G06F 7/42 (2006.01)

(52) U.S. Cl. ...................... 708/211; 708/505
(58) Field of Classification Search ................ 708/211, 708/495, 505
See application file for complete search history.

(56) References Cited

U.S. PATENT DOCUMENTS

| | | | | |
|---|---|---|---|---|
| 5,831,884 A | * | 11/1998 | Suzuki | 708/505 |
| 6,178,437 B1 | * | 1/2001 | Dhong et al. | 708/505 |
| 6,205,461 B1 | * | 3/2001 | Mansingh | 708/497 |
| 6,405,232 B1 | * | 6/2002 | Green et al. | 708/505 |
| 6,499,044 B1 | * | 12/2002 | Brooks et al. | 708/211 |
| 6,594,679 B1 | * | 7/2003 | Lee et al. | 708/211 |
| 6,779,008 B1 | * | 8/2004 | Erle et al. | 708/211 |

* cited by examiner

*Primary Examiner*—Tan V. Mai
(74) *Attorney, Agent, or Firm*—Kenyon & Kenyon

(57) ABSTRACT

Method and apparatus are described for anticipating the number of leading zeros or leading ones in a sum of mantissas irrespective of the sign of the result or the relative magnitudes of the input operands using a leading zero anticipation (LZA) device. An algorithm is presented for leading zero and leading one anticipation that may be used to remove leading zeroes or ones from sums produced in arithmetic units. This algorithm and the design of the combinational logic does not require a comparison of input operands nor does it need two separate counters for leading zeros and leading ones as in most other LZAs. The present invention is especially applicable to redundant format addition.

18 Claims, 3 Drawing Sheets

US 7,024,439 B2

LEADING ZERO ANTICIPATORY (LZA) ALGORITHM AND LOGIC FOR HIGH SPEED ARITHMETIC UNITS

BACKGROUND OF THE INVENTION

The field of the present invention is the field of Leading Zero Anticipators (LZA) that predict the number of leading zeros or leading ones in a sum of mantissas generated by an adding device used to add two floating point numbers.

Leading Zero Anticipators ("LZAs") are typically used to predict the number of leading zeros in a sum of mantissas during floating point addition. Prediction of the number of leading zeroes is used to normalize the result of the addition and is performed at the same time as (in parallel with) mantissa addition, which increases the speed of the normalization process that is performed after mantissa addition has been completed.

In a traditional LZA design shown in FIG. 1, mantissaA and mantissaB (labeled as 10) both enter the adder 13 and the LZA 12 simultaneously. A normalization shift is performed by the shifter 15 after addition is performed. LZAs 12 are commonly used in devices performing fast addition that try to reduce the number and length of clock cycles required to do the addition and in devices that implement a single instruction which performs multiplication followed by addition. The use of redundant formats such as the carry-save format during addition does not require the use of the LZA during the addition. But the use of redundant formats does require placement of an LZA in parallel with a second adder which adds the sum and carry bit streams generated by the carry-save addition process. The sum and carry bit streams are added before the final normalization stage is completed. In such circuits, the carry and sum become the input operands (mantissaA and mantissaB) that are transmitted to the adder in FIG. 1. The nature of addition in redundant formats invalidates the use of several LZAs in the final add operation. For instance, in the carry-save format, the carry term is shifted left by 1 bit position (equivalent to multiplying the carry value by 2) before addition is performed. If there is a negative carry term and a positive sum term, the left shift that is performed after carry save addition might shift out the leading one of the carry term, making it a positive number (the leading bit indicates sign). The addition of two seemingly positive numbers (sum and carry) may then produce a valid negative number. This seemingly contradictory result is valid in carry-save addition but invalidates the assumptions made in the designs of many LZAs. For example, consider a carry (value −6) and a sum (value 7) with expected final result −6×2+7=−5. The corresponding 4 bit binary vectors in 2's complement are carry 1010 and sum 0111. When the carry is shifted left 1 bit, it becomes 0100. Adding 0100 (which is now seemingly a positive number) to 0111 (also a positive number) gives 1011 which is a negative number (−5) and is the correct expected final result.

Another drawback of conventional LZAs occurs if the operation is a subtraction. Traditional application of LZAs during subtraction requires that the mantissa of the smaller operand must be subtracted from the mantissa of the larger operand so that a positive result is generated. To insure that the operand of smaller magnitude is subtracted from the greater one, a comparator is used to determine which mantissa is larger. This is expensive because of the need to use extra logic gates. Another traditional method of leading zero anticipation does not require comparison but uses 2 LZAs together which are implemented so that they make opposite assumptions about the sign of the generated result when anticipating the number of leading zeroes or ones. The correct LZA output is then chosen depending on the sign of the result of the addition. This is also expensive.

Yet another conventional implementation of LZAs does not require comparison of mantissas and uses just one LZA. However logic designers implementing this form of LZA must assume that the "normal" rules of addition apply when the operands are added. Consequently, this implementation cannot be used when the input operands are expressed in redundant formats, such as the carry save format. This is the case because addition in redundant format does not follow all the conventions of normal addition as explained above.

Therefore, what is required is a novel LZA that may be implemented with a single LZA and that is implemented in a way that does not make assumptions regarding rules of addition that preclude the use of redundant formats such as the carry save format. Also, an LZA that does not require comparison of the magnitude of the input operands or knowledge of the sign of the result in order to anticipate the number of leading zeroes or leading ones is needed.

DETAILED DESCRIPTION

The present invention pertains to a method to anticipate the number of leading zeros or leading ones in the result of the addition of two floating point numbers. The present invention may be used to remove leading zeroes or ones from sums produced in arithmetic units. Typically, the present invention will be used to remove leading zeroes or ones from the sum of mantissas of two floating point numbers.

The algorithm and combinational logic of the present invention do not necessarily require a comparison of input operands nor do they need two separate counters in order to count the number of leading zeros and leading ones as required in most other LZAs. The combinational logic of the LZA of the present invention does not need to incorporate specific assumptions about properties of addition, and may be used in implementations using redundant formats such as the carry-save format that do not follow the rules of conventional addition. The combinational logic presented here can be more efficient than other designs used to perform leading zero and leading one anticipation in that anticipation can be performed more quickly and with fewer components, saving costs.

Figure 1:
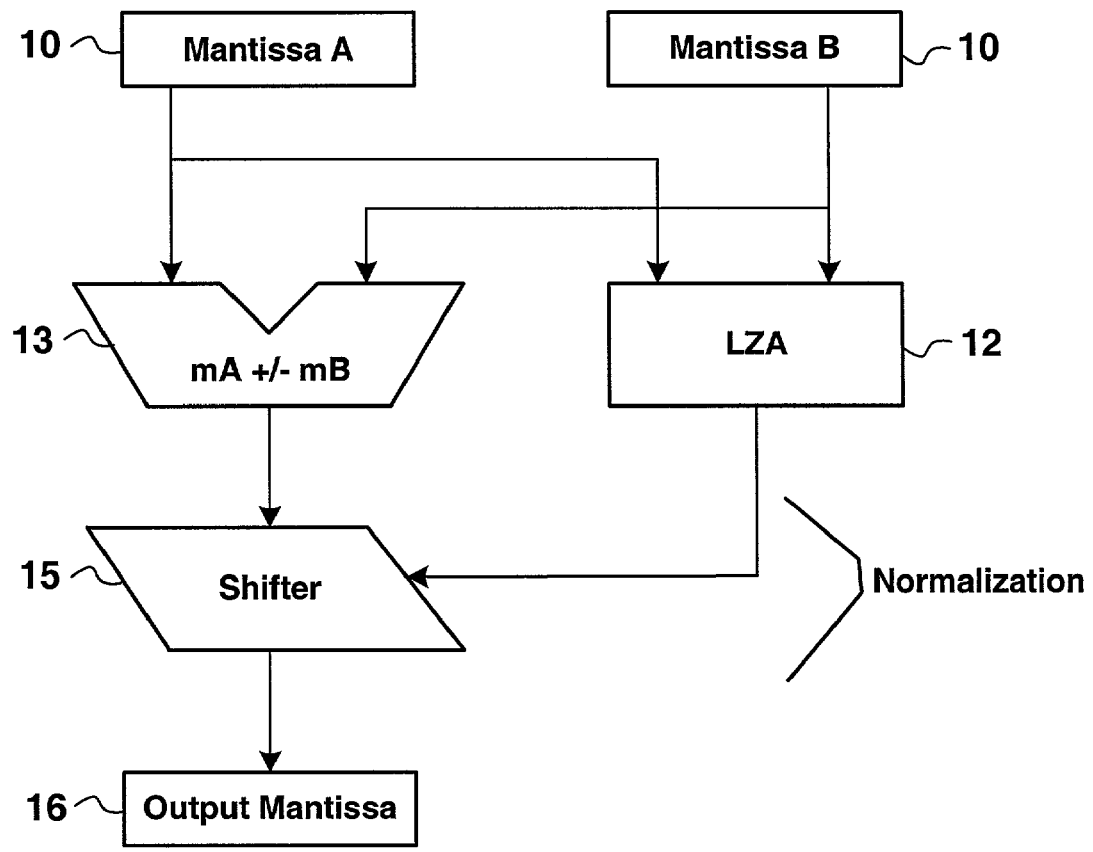
FIG. 1 illustrates an adder circuit using a Leading Zero Anticipator (LZA) in the prior art.
Figure 2:
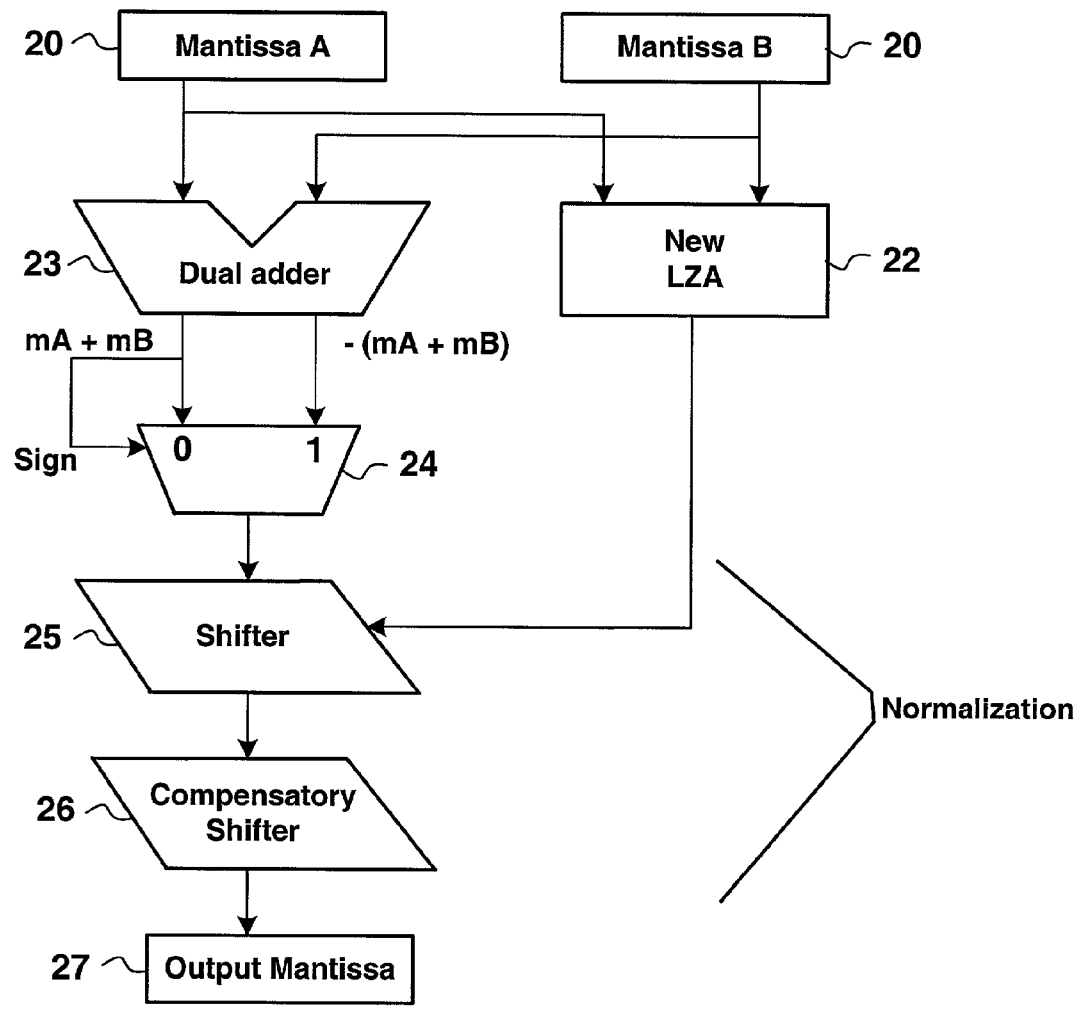
FIG. 2 illustrates an adder circuit and using the Leading Zero Anticipator (LZA) according to an embodiment of the present invention.

One possible application of the present invention is shown in FIG. 2. This implementation includes a dual adder 23 that performs addition of two mantissas and produces the sum as well as its 2's complement (negative of the sum). If the sum is a negative number, its 2's complement will be positive and is chosen as the final result. An LZA 22 typically includes combinational logic which predicts the position of the first logical 1 (0 for negative result mantissas) and a counter that typically may be one of the last stages of the logic circuitry of the LZA 22. This counter counts the number of leading zeroes (ones for negative result mantissas) in the sum by counting the number of bits to the left of an indicating one in a predictive bit stream. One or more of the bits of mantissaA and mantissaB (20) which are in 2's complement format are transmitted to the dual adder 23 and the LZA 22 simultaneously. Typically, the present invention includes a logic design in which the LZA 22 receives sets of three bits of each input operand simultaneously and generates a vector L (predictive bit stream) that has a leading one in the bit position before the leading 0 or 1 of the mantissa sum ("before" in this context typically means "to the left of"). Any fast counter that counts the number of zeros "before" the leading 1 in the generated vector L may be used as part of the LZA 22. The predictive count produced by the counter is the output data transmitted by the LZA 22 and is used to perform normalization shifting. Normalization shifting is performed by the shifter 25 and is used to remove leading zeroes in a mantissa sum. The same predictive count may be used regardless of whether the resulting mantissa is positive or negative, i.e. regardless of whether the multiplexer 24 output in FIG. 2 is the addition result or its 2's complement.

FIG. 2 shows a configuration including the LZA 22 of the present invention. MantissaA and mantissaB are transmitted to the dual adder 23 and the LZA 22 of the present invention. The result of mantissaA plus mantissaB is transmitted to the multiplexer 24 when a dual adder is used. The positive result is chosen (based on the sign of the first sum) and then transferred to the bit shifter 25. Bit shifter 25 shifts the sum to the left by the "count" quantity (the number of leading zeroes in L before the predictive one) calculated by the LZA 22. The "count" quantity indicates a value one less than the number of leading zeroes before the first logical one in the final sum. Shifter 26 is required to do an additional shift to account for remaining one or two leading zeroes.

In a single adder implementation, the mantissas are added, and a positive or negative sum is produced. If the single adder produces a negative result (the sign bit will indicate the sign of the result), then leading ones may need to be shifted out of the sum. If the output transmitted from the adder is negative, another circuit converts it into a positive sum after the shifting. As before, a further shift of the positive value by one or two bits may be required.

The combinational logic of the LZA 22 attempts to predict a change in the bit pattern of the sum of the mantissas such as the following: 1 . . . 11→0 (sequence of ones followed by a zero) or 0 . . . 00→1 (sequence of zeroes followed by a one). Examining three bits at a time of each of the input mantissas (starting with the most significant bit) is sufficient to determine if such a transition 0→1 or 1→0 will occur between the first and second bits of the 3 bit group of bits in the sum mantissa that is currently being generated.

Figure 3:
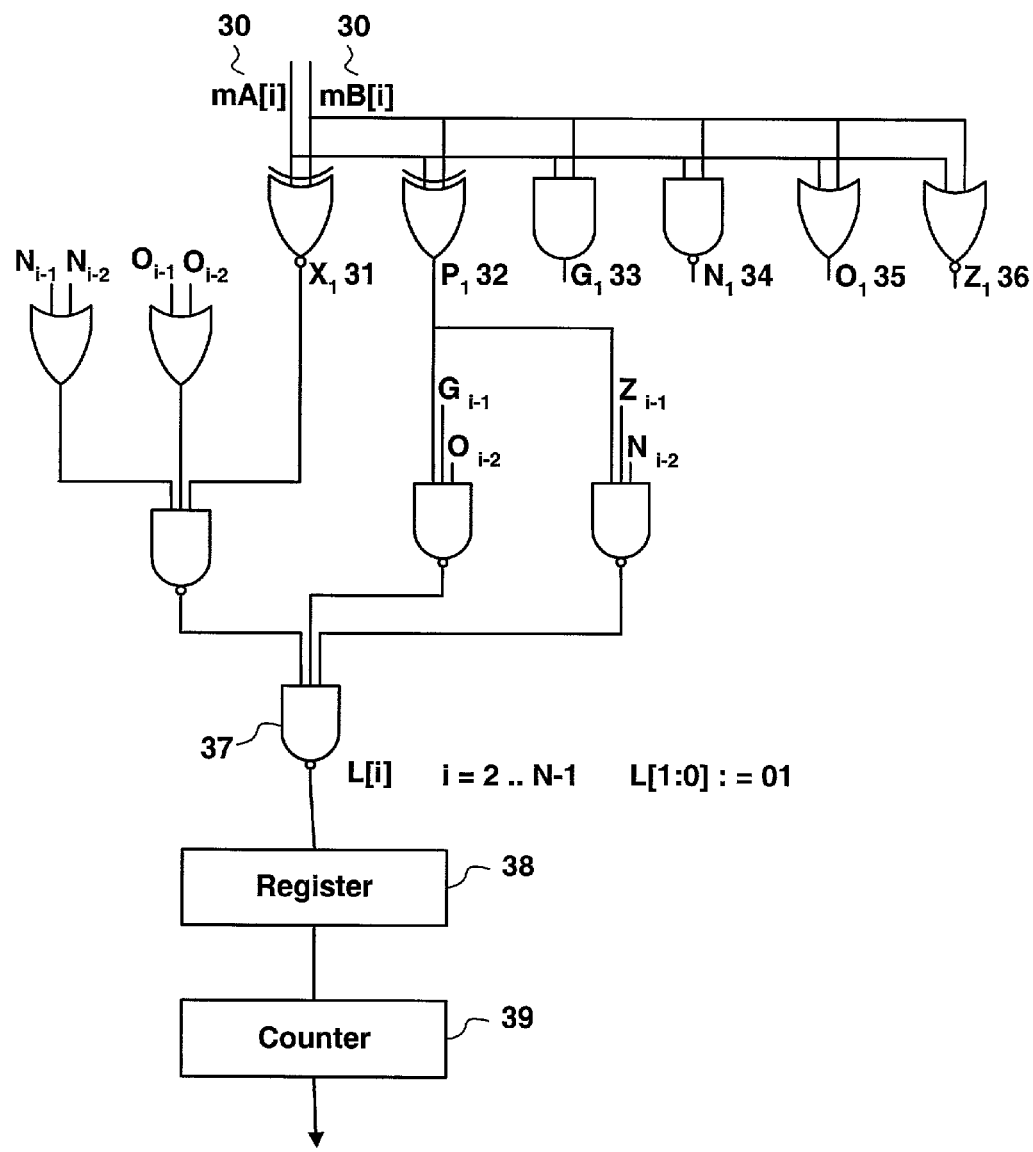
FIG. 3 illustrates logic circuitry that implements the LZA according to an embodiment of the present invention.

A portion of combinational logic circuitry implementing the LZA 22 of the present invention is shown in FIG. 3. Bits from the two mantissas mA and mB labeled 30 are received by the combinational logic elements 31–36 shown in FIG. 3. Mantissa bits are received and processed by a variety of logic gates in the LZA. Some of the logic gates/logic elements that receive and process mantissa bits are labeled as follows: the xnor ("X"=A XNOR B) gate 31, the "propagate" ("P"=A XOR B) gate 32, the "generate" ("G"=A AND B) gate 33, the nand ("N"=A NAND B) gate 34, the or ("O"=A OR B) gate 35, and the "zero" ("Z"=NOT A AND NOT B) gate 36 transmit logical output bits for each bit pair of the input operands.

The vector L (37) is generated by these logic gates typically by transmitting the signals mA and mB to the logic gates 3 bits at a time. The most significant 3 bits of each mantissa mA and mB are transmitted to the logic gates pictured in FIG. 3, then the second, third, and fourth most significant bits of each mantissa are transmitted to the logic gates, and so forth. N−2 groups of 3 bits are transmitted to the logic gates, where N is equal to the total number of bits in each mantissa. This process may be repeated until every bit of each mantissa has been transmitted to the circuit shown in FIG. 3.

When gate 37 or any bit position of vector L transmits a one, a transition 0→1 or 1→0 in the mantissa sum is indicated. The P, G, Z, X, N and O signals are generated for each of the bit pairs of the input operands. The outputs of each logic element in FIG. 3 are thus labeled as X or Z or P and so on. For each group of 3 bits, the signals that have value one are used to build a 3 letter pattern. Thus, each of the letters of each pattern correspond to a logic gate labeled with that letter that transmits a high signal. The first letter of the three letter pattern represents a gate in the first stage of FIG. 3, the second letter represents a gate in the second stage, and so forth. Gate 37 generates a one for certain patterns of the 3 bit pairs of the mantissa inputs. For example, pattern ZZG causes gate 37 to generate a one because it reflects a 0→1 transition. ZZG represents the addition of the values 001 and 001 with a potential carry bit, C. In adding these two values together, the result would be 01C' meaning there is a 0→1 transition between the first and second bits. The pattern ZGG, on the other hand, causes gate 37 to generate a zero because it does not indicate such a transition. ZGG represents the addition of the values 011 and 011 with a potential carry bit C. In adding these two values together, the result is 11C meaning that there is no 0→1 transition between the first and second bits.

With the values Z, P, and G, there are twenty-seven possible patterns for three bit values. Of these values, the following eighteen patterns imply a transition from a leading zero or one when they occur: PGP, PGG, PZP, PZZ, ZZP, ZZG, ZPZ, ZPP, ZPG, GZP, GZG, GPZ, GPP, GPG, GGZ, GGP, ZGZ, and ZGP. The "P", "G", "X", "Z", "N" and "O" signals may be tapped from the adder 23 shown in FIG. 2 if the proper adder is used. The number of logic levels required may also be reduced through the use of complex gates. The vector L that is generated by the LZA 22 may be stored in register 38 and is transmitted to a standard leading zero counter 39 to produce the LZA count. The counter in the LZA 22 may be of any form, but it should be able to count from zero up to the width of the input operands. The least significant bit of the vector L (37) is designated "1" to satisfy the case when the leading zero or one is in the last two bits of the result and therefore cannot be predicted by the LZA 22 logic circuitry.

The vector L has a "1" at the bit position of the predicted transition. The LZA count value is used to shift the addition result left and remove the leading zeroes or ones. The initial prediction of LZA count could be inaccurate by 1 bit position to the left in some cases (specifically the following six of the eighteen cases mentioned earlier: PGP, PZP, ZZP, GZP, GGP, and ZGP). During the addition of the input operands, the carry propagates from the least significant bit (rightmost) to the most significant bit (leftmost). The value of this carry could further increase the number of leading zeroes by one. On the other hand, when the final addition result is negative (leading ones) the 2's complement value out of the dual adder is chosen. This can decrease the number of leading zeros by one. For example, PGP represents the addition of two values (i.e., 111 and 010, or 011 and 110) with a potential carry bit, C. The result is 0CC'. Thus, if C is 0, then the result is 001 and if C is 1, then the result is 010.

It may be necessary to have a final left correction in the LZA count value by 0 or 1 or 2. This correction is equal to the number of leading zeroes remaining in the final positive mantissa after normalization shifting. An additional shift is then done to remove them. While FIG. 2 and FIG. 3 show a particular embodiment of the present invention, the LZA of the present invention may be used in a variety of applications and contexts.

While certain embodiments of the present invention have been described herein, the present invention should not be construed as being restricted to those embodiments. All embodiments and implementations covered by the claims as amended will be embraced by the present invention.

What is claimed is:

1. A circuit comprising:
   a plurality of logic elements to receive at least one bit of a first input mantissa and at least one bit of a second input mantissa;
   said plurality of logic elements to generate and transmit a predictive bit stream including an indicating bit in a bit position before a leading zero and before a leading one of the sum of said mantissas;
   a counter to generate a predictive count equal to a number of bits between a first bit generated of the predictive bit steam and said indicating bit in the predictive bit stream, wherein said counter is to transmit a predictive count.

2. The circuit of claim 1 wherein said plurality of logic elements is an LZA device.

3. A circuit comprising:
   a plurality of logic elements to receive at least one bit of a first input mantissa and at least one bit of a second input mantissa;
   said plurality of logic elements to generate and transmit a predictive bit stream including an indicating bit in a bit position before a leading zero and before a leading one of the sum of said mantissas;
   a counter to generate and transmit a predictive count equal to a number of bits between a first bit generated of the predictive bit stream and said indicating one bit in the predictive bit stream;
   an adder circuit to receive said input mantissas and calculate a sum of said input mantissas;
   a shifter circuit to receive said sum from the adder circuit and said predictive count from the plurality of logic elements, arid to shift said sum to remove leading zeroes positioned in more significant positions than a most significant bit of the sum, wherein said shifting is performed a number of times equal to said predictive count;
   a compensatory shifter circuit to receive the shifted sum and to shift the sum to the left by zero to two bits to remove any remaining leading zeros.

4. The circuit of claim 3, wherein the plurality of logic elements each are to accept consecutive bits of the first and second input mantissas in groups of three and each group includes at least two bits from a previous group.

5. The circuit of claim 4, wherein the plurality of logic elements is to receive a plurality of groups of three bits from a first input mantissa and a plurality of groups of three bits from a second input mantissa, wherein the first groups of bits received are the most significant bits in the input mantissas, and subsequent groups are received whose bits are less significant than the bits of the previously received bit groups by one bit position.

6. The circuit of claim 5, wherein a number of bits entering the plurality of logic elements is exactly three for each mantissa.

7. The circuit of claim 6, wherein the plurality of logic elements is to generate a one if the addition of the three bits of the first and second input mantissas will produce a three bit sum in which the first two bits are one or 0 and 1 respectively and 1 and 0 respectively.

8. The circuit of claim 7, wherein the generated bits make up the predictive bit stream.

9. The circuit of claim 3, wherein the plurality of logic elements each are to simultaneously accept bits of the first and second input mantissas in groups of three and each group includes at least two bits from a previous group.

10. The circuit of claim 9, wherein the plurality of logic elements receive a plurality of groups of three bits from a first input mantissa and a plurality of groups of three bits from a second input mantissa, the first groups of bits received are the most significant bits in the input mantissas, subsequent groups are received whose bits are less significant than the bits of the previously received bit groups by one bit position.

11. The circuit of claim 10, wherein the adder circuit is to transmits a sum and a two's complement of the sum of the input mantissas.

12. The circuit of claim 11, wherein the input mantissas are carry and sum parts of an addition result and the addition is performed in a redundant carry-save format.

13. A method of anticipating one of a number of leading zero and leading one bits in a sum of two numbers, the method comprising:
    receiving by a plurality of logic elements a plurality of groups of three bits from a first input mantissa and a plurality of groups of three bits from a second input mantissa, wherein the first groups of bits received are the most significant bits in the input mantissas, subsequent groups are received whose bits are less significant than the bits of the previously received bit groups by one bit position;
    generating a predictive bit stream by the plurality of logic elements possessing an indicating bit ma bit position before one of a leading zero and before a leading one of the sum of said mantissas, wherein the predictive bit stream has a one in a bit position if the addition of the corresponding group of three bits from first input mantissa and the corresponding group of three bits from second input mantissa produces a three bit sum in which a first two bits of the sum are one of 0 and 1 respectively and 1 and 0 respectively, and otherwise has a zero in that bit position; transmitting the predictive bit stream to a counter; and
    generating a predictive count by a counter equal to a number of bits between a first bit generated by the predictive bit stream and said indicating bit in the predictive bit stream.

14. The method of claim 13 comprising receiving said input mantissas and calculating a sum of said input mantissas and transmitting a bit stream representing the sum of the mantissas.

15. The method of claim 14 further comprising receiving said sum from the adder circuit and said predictive count from the plurality of logic elements, shifting said sum to remove leading zeroes positioned in more significant positions than a most significant bit of the sum, wherein said shifting is performed a number of times equal to said predictive count.

16. The method of claim 15 further comprising receiving the shifted sum and shifting the sum to the left by zero to two bits to remove remaining leading zeroes.

17. The method of claim 16, wherein the bits enter the plurality of logic elements in groups of three for each mantissa.

18. The method of claim 17, wherein the adder generates a sum and 2's complement of the sum of the input mantissas and transmits the positive result as the sum.

* * * * *

UNITED STATES PATENT AND TRADEMARK OFFICE
CERTIFICATE OF CORRECTION

| | |
|---|---|
| PATENT NO. | : 7,024,439 B2 |
| APPLICATION NO. | : 10/057257 |
| DATED | : April 4, 2006 |
| INVENTOR(S) | : Yatin Hoskote |

It is certified that error appears in the above-identified patent and that said Letters Patent is hereby corrected as shown below:

Column 6, line 31: "bit ma bit position" should be --bit in a bit position--

Signed and Sealed this

Twenty-second Day of August, 2006

JON W. DUDAS
*Director of the United States Patent and Trademark Office*